United States Patent
Zhu

(10) Patent No.: US 9,654,801 B2
(45) Date of Patent: May 16, 2017

(54) ADVANCED VIDEO CODING AND DECODING CHIP AND ADVANCED VIDEO CODING AND DECODING METHOD

(71) Applicant: VIA Alliance Semiconductor Co., Ltd., Shanghai (CN)

(72) Inventor: ChuanChuan Zhu, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 131 days.

(21) Appl. No.: 14/689,225

(22) Filed: Apr. 17, 2015

(65) Prior Publication Data

US 2016/0173908 A1 Jun. 16, 2016

(30) Foreign Application Priority Data

Dec. 11, 2014 (CN) .......................... 2014 1 0766061

(51) Int. Cl.
*H04N 19/00* (2014.01)
*H04N 19/625* (2014.01)
*H04N 19/436* (2014.01)
*H04N 19/61* (2014.01)

(52) U.S. Cl.
CPC ......... *H04N 19/625* (2014.11); *H04N 19/436* (2014.11); *H04N 19/61* (2014.11)

(58) Field of Classification Search
CPC ..... H04N 19/625; H04N 19/436; H04N 19/61
USPC ...................................... 375/240.03
See application file for complete search history.

(56) References Cited

U.S. PATENT DOCUMENTS

2007/0140349 A1  6/2007  Burazerovic

FOREIGN PATENT DOCUMENTS

TW  200533206  10/2005
TW  I335183  12/2010

OTHER PUBLICATIONS

Khan, M.U.K., et al; "An H.264 Quad-FullHD Low-Latency Intra Video Encoder"; IEEE; Mar. 18, 2013; pp. 115-120.*

(Continued)

*Primary Examiner* — Jeffery Williams
(74) *Attorney, Agent, or Firm* — McClure, Qualey & Rodack, LLP

(57) ABSTRACT

An advanced video coding and decoding chip and a method with a hardware design that calculates direct current coefficients in discrete-cosine-transformed residual blocks corresponding to sixteen sub-blocks within a macroblock and alternating current coefficients in the discrete-cosine-transformed residual blocks corresponding to the sixteen sub-blocks within the macroblock separately and in parallel.

8 Claims, 4 Drawing Sheets

(56) References Cited

OTHER PUBLICATIONS

"H.264—Series H: Audiovisual and Multimedia Systems Infrastructure of audiovisual services—Coding of moving video—Advanced video coding for generic audiovisual services;" Mar. 2005; pp. 1-332.
Chinese language office action dated Aug. 16, 2016, issued in application No. TW 104132490.
Extended European Search Report dated Feb. 2, 2016, issued in application No. 15189517.4-1908.
Khan, M.U.K., et al, "Multicast FullHD H.264 Intra Video Encoder Architecture"; IEEE Transactions on Computer Aided Design of Integrated Circuits and Systems, IEEE Service Center, vol. 34, No. 12; Dec. 1, 2015; pp. 2049-2053.
Genhua J., et al, "An Efficient Pipelined Architecture for H.264/AVC Intra Frame Processing"; IEEE; May 1, 2007; pp. 1605-1608.

* cited by examiner

FIG. 2

ADVANCED VIDEO CODING AND DECODING CHIP AND ADVANCED VIDEO CODING AND DECODING METHOD

CROSS REFERENCE TO RELATED APPLICATIONS

This Application claims priority of China Patent Application No. 201410766061.9, filed on Dec. 11, 2014, the entirety of which is incorporated by reference herein.

BACKGROUND OF THE INVENTION

Field of the Invention

The present invention relates to an advanced video coding and decoding chip and method, and it particularly relates to H.264 high-resolution video recording, compression, and release.

Description of the Related Art

H.264, introduced in part 10 of MPEG-4, is an advanced video format that is mature in the use of video compression and codecs, and is gradually being widely adopted in many applicationslike those for videoconferencing, video surveillance, consumer electronics, and so onthat demand high-resolution and real-time video coding. Therefore, how to optimize H.264 encoder hardware to achieve high-resolution and real-time video transmission is a popular topic.

BRIEF SUMMARY OF THE INVENTION

Advanced video coding and decoding technology with coding speed optimization, which dramatically improves the coding speed of H.264 encoder hardware, is disclosed.

An advanced video coding and decoding chip in accordance with an exemplary embodiment of the disclosure comprises direct current (DC) coefficient evaluation hardware, Hadamard transform hardware, alternating current (AC) coefficient evaluation hardware and quantization hardware. The DC coefficient evaluation hardware evaluates DC coefficient in discrete-cosine-transformed residual blocks corresponding to sixteen sub-blocks (each containing 4×4 pixels) within a macroblock. The Hadamard transform hardware performs Hadamard transform on the DC coefficient to generate Hadamard-transformed DC coefficient corresponding to the sixteen sub-blocks. The AC coefficient evaluation hardware evaluates AC coefficient in the discrete-cosine-transformed residual blocks of the sixteen sub-blocks. The quantization hardware performs quantization on the Hadamard-transformed DC coefficient corresponding to the sixteen sub-blocks and the AC coefficient corresponding to the sixteen sub-blocks, and thereby transform coefficients corresponding to the sixteen sub-blocks are evaluated. The Hadamard transform hardware starts the Hadamard transform on the DC coefficient corresponding to the sixteen sub-blocks before the AC coefficient evaluation hardware completely evaluates the AC coefficient corresponding to the sixteen sub-blocks.

In an exemplary embodiment, the following calculation is executed by the DC coefficient evaluation hardware:

$$DC_k = \Sigma_{i=0}^{3} \Sigma_{j=0}^{3} (X_k)_{ij}, k0 \ldots 15,$$

where $X_k$ is a residual block of one of the sixteen sub-blocks and, after being discrete cosine transformed, the DC coefficient corresponding thereto is $DC_k$.

In another exemplary embodiment of the disclosure, an advanced video coding and decoding method is disclosed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2 shows one macroblock, an encoding unit with 16×16 pixels for the advanced video coding and decoding chip 100, wherein $X_0$ to $X_{15}$ are residual blocks corresponding to the sixteen sub-blocks (each containing 4×4 pixels) within the macroblock;

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
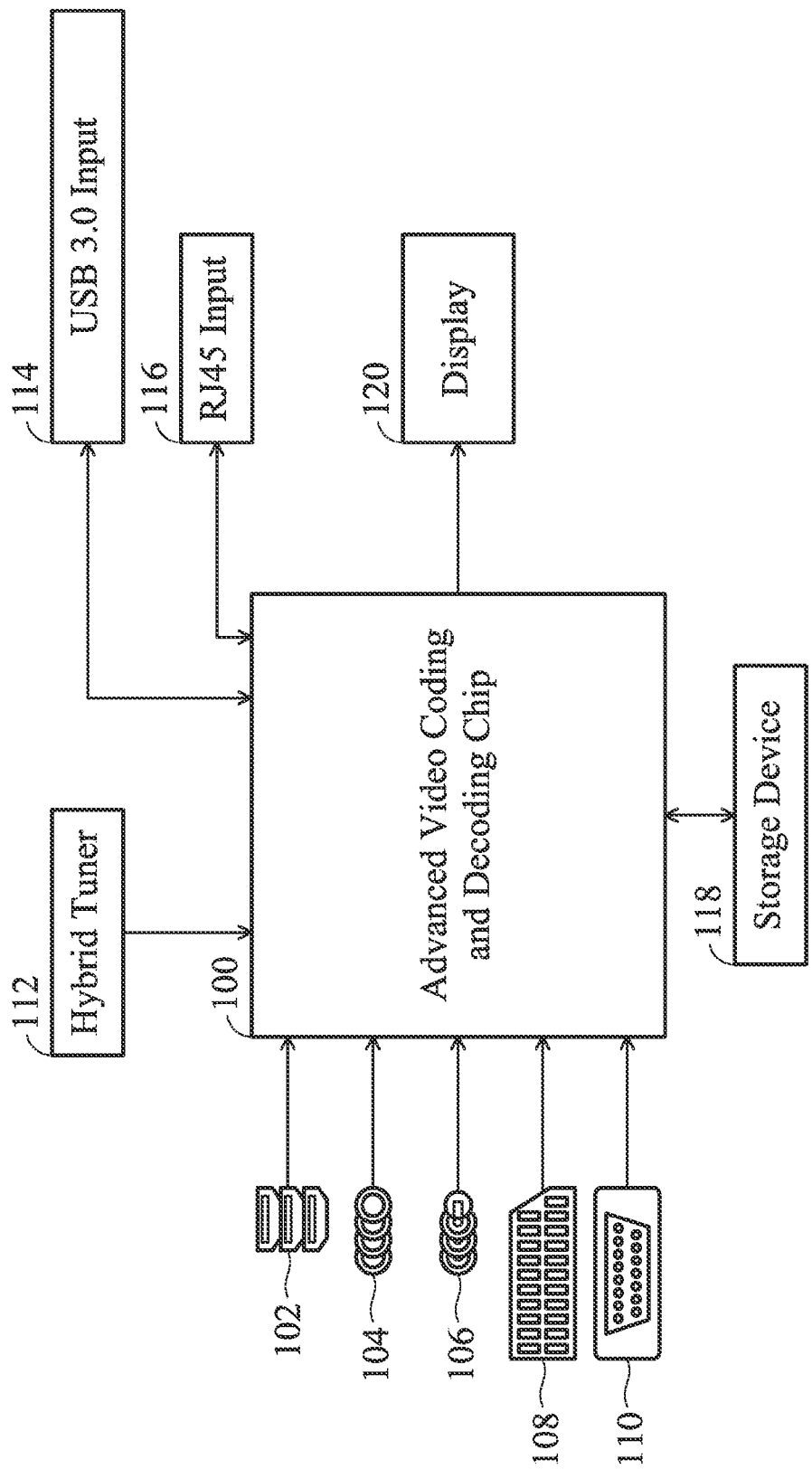
FIG. 1 depicts how an advanced video coding and decoding chip 100 is used in different applications.

FIG. 1 depicts how an advanced video coding and decoding chip 100 is used in different applications. The advanced video coding and decoding chip 100 may be fabricated by a system-on-chip (SOC) technology for advanced video coding and decoding like H.264. The advanced video coding and decoding chip 100 may retrieve video data from a high-definition multimedia interface (HDMI) 102, a YPbPr input 104, a multiple CVBS input 106, an SCART input 108, an RGB input 110, a hybrid tuner 112, an USB 3.0 input 114, an RJ45 input 116 and so on, and stores the encoded and compressed video into a storage device 118. The advanced video coding and decoding chip 100 may further recover a high-definition video from the compressed video, and the high-definition video is displayed on the display 120.

Figure 2:
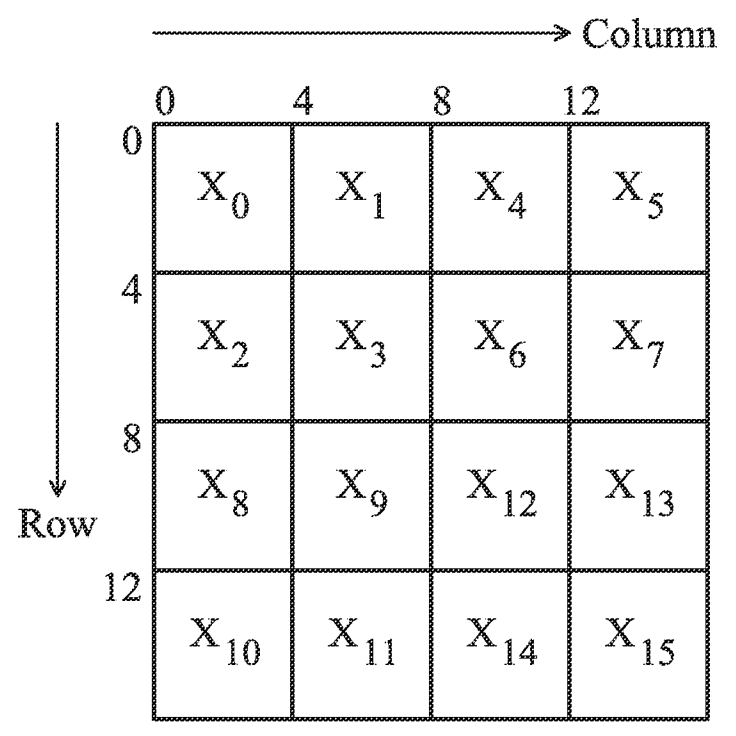

FIG. 2 shows one macroblock, an encoding unit with 16×16 pixels for the advanced video coding and decoding chip 100, wherein $X_0$ to $X_{15}$ are residual blocks corresponding to the sixteen sub-blocks (each containing 4×4 pixels) within the macroblock.

Figure 3:
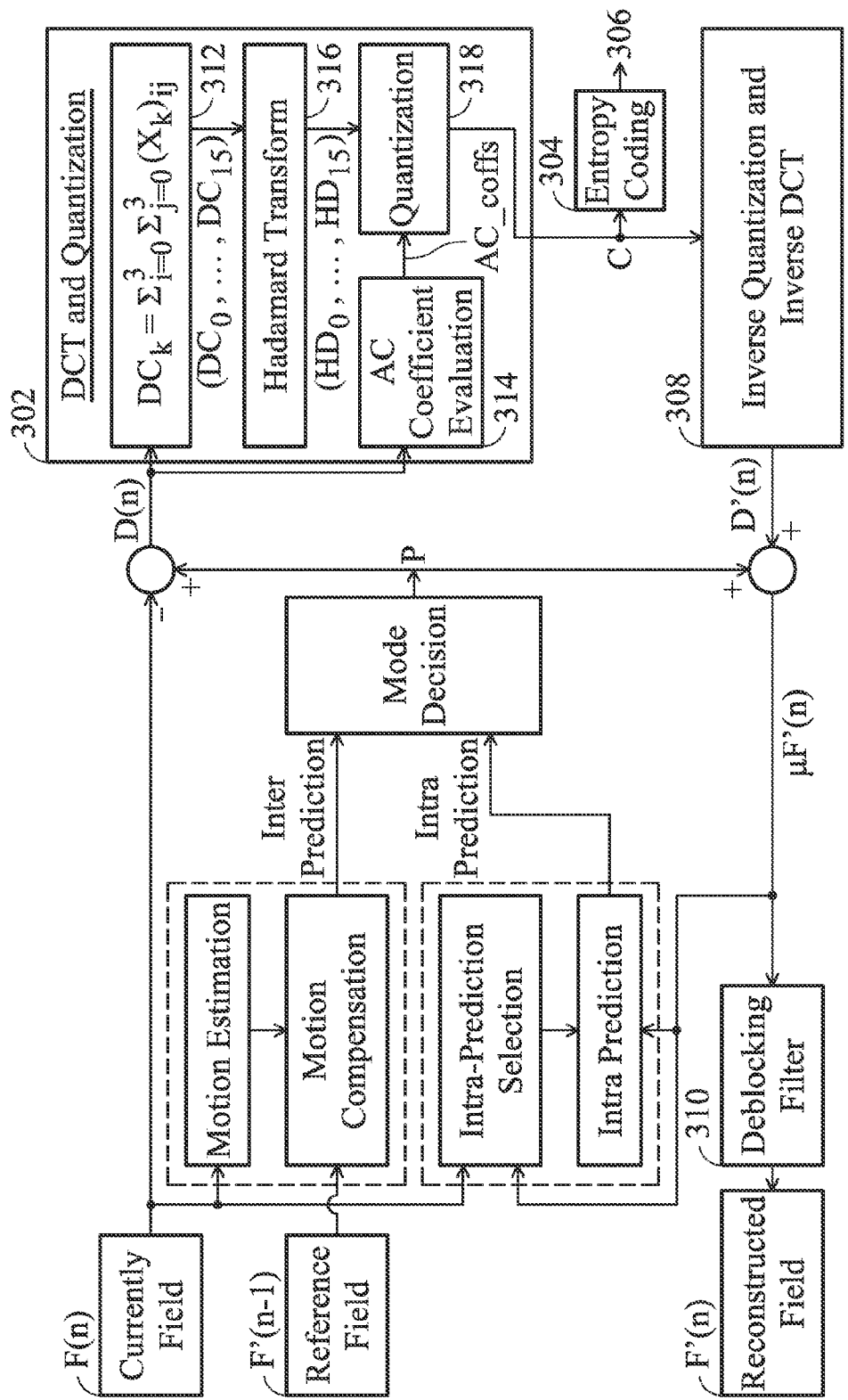
FIG. 3 is a block diagram depicting the internal hardware of the advanced video coding and decoding chip 100 in accordance with an exemplary embodiment of the disclosure, wherein the hardware evaluating direct current (DC) coefficient for discrete cosine transform (DCT) is separated from the hardware evaluating alternating current (AC) coefficient for DCT and may be operated in parallel.

FIG. 3 is a block diagram depicting the internal hardware of the advanced video coding and decoding chip 100 in accordance with an exemplary embodiment of the disclosure. There are two types of coding algorithms: intra prediction coding; and inter prediction coding. The intra prediction coding generates predicted pixels P from the pixels within the current field F(n). As for the inter prediction coding, a reconstructed field F'(n−1), also known as a reference field, of the previous field is also taken into account to generate the predicted pixels P. Residual values D(n) are calculated from the difference between the predicted pixels P and the current field F(n). The residual values D(n) are transformed into transform coefficients C by DCT (discrete cosine transform) and quantization hardware 302. Then, the transform coefficients C are transformed into an advanced video coding stream 306 by entropy coding hardware 304. Furthermore, the transform coefficients C are further converted by inverse DCT and inverse quantization hardware 308 to generate reconstructed residual values D'(n). The reconstructed residual values D'(n) are added back to the predicted pixels P to form reconstructed pixels μF'(n). The reconstructed pixels μF'(n) are processed by deblocking filter hardware 310 and thereby a reconstructed field F'(n) is reconstructed as a reference field for the next coding field.

As shown in block 302 of FIG. 3, the hardware evaluating the direct current (DC) coefficients for DCT is separated from the hardware evaluating the alternating current (AC) coefficients for DCT and may be operated in parallel. It means that the DC and AC coefficients are not evaluated in sequence. One evaluation is performed without waiting for another evaluation. As shown, DC coefficient evaluation hardware 312, AC coefficient evaluation hardware 314, Hadamard transform hardware 316 and quantization hardware 318 are integrated in the DCT and quantization hardware 302, which are described in detail below.

The DC coefficient evaluation hardware 312 performs the calculation of equation (1):

$$DC_k = \Sigma_{i=0}^{3} \Sigma_{j=0}^{3} (X_k)_{ij}, k=0 \ldots 15 \quad (1)$$

where Xk, any of X0 to X15 (referring to FIG. 2), is a residual block of one of the sixteen sub-blocks (each containing 4×4 pixels) within one macroblock, and, after being discrete cosine transformed, the DC coefficient corresponding thereto is DCk. The DC coefficient valuation hardware 312 is provided to speed up the evaluation of the DC coefficients, (DC0 ... DC15), to complete the DCT on the residual blocks X0 ... X15.

Based on the DC coefficients ($DC_0 \ldots DC_{15}$) evaluated from the DC coefficient evaluation hardware 312, the Hadamard transform hardware 316 performs the calculation of equation (2):

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix} Y_D \begin{bmatrix} 1 & 1 & 1 & 1 \\ 1 & 1 & -1 & -1 \\ 1 & -1 & -1 & 1 \\ 1 & -1 & 1 & -1 \end{bmatrix} = \quad (2)$$

$$\begin{bmatrix} HD_0 & HD_1 & HD_2 & HD_3 \\ HD_4 & HD_5 & HD_6 & HD_7 \\ HD_8 & HD_9 & HD_{10} & HD_{11} \\ HD_{12} & HD_{13} & HD_{14} & HD_{15} \end{bmatrix}$$

where $Y_D$ is:

$$Y_D = \begin{bmatrix} DC_0 & DC_1 & DC_2 & DC_3 \\ DC_4 & DC_5 & DC_6 & DC_7 \\ DC_8 & DC_9 & DC_{10} & DC_{11} \\ DC_{12} & DC_{13} & DC_{14} & DC_{15} \end{bmatrix}$$

Accordingly, the Hadamard transform hardware 316 generates Hadamard-transformed DC coefficients ($HD_0 \ldots HD_{15}$).

The AC coefficients $AC_{k0}$ to $AC_{ke}$ (collectively referred to as AC_coeffs, where k=0 ... 15,) to complete the DCT on the residual blocks $X_0 \ldots X_{15}$ (each is a matrix of 4×4) are evaluated by the AC coefficient evaluation hardware 314 in accordance with equation (3):

$$\begin{bmatrix} 1 & 1 & 1 & 1 \\ 2 & 1 & -1 & -2 \\ 1 & -1 & -1 & 1 \\ 1 & -2 & 2 & -1 \end{bmatrix} X_k \begin{bmatrix} 1 & 2 & 1 & 1 \\ 1 & 1 & -1 & -2 \\ 1 & -1 & -1 & 2 \\ 1 & -2 & 1 & -1 \end{bmatrix} = \quad (3)$$

$$\begin{bmatrix} DC_k & AC_{k0} & AC_{k1} & AC_{k2} \\ AC_{k3} & AC_{k4} & AC_{k5} & AC_{k6} \\ AC_{k7} & AC_{k8} & AC_{k9} & AC_{ka} \\ AC_{kb} & AC_{kc} & AC_{kd} & AC_{ke} \end{bmatrix}$$

Note that the DC coefficients $DC_0 \ldots DC_{15}$ corresponding to the sixteen residual blocks $X_0 \ldots X_{15}$ have been evaluated by the DC coefficient evaluation hardware 312 based on equation (1) already. Thus, the values $DC_0 \ldots DC_{15}$ evaluated by the AC coefficient evaluation hardware 314 in accordance with equation (3) can be abandoned.

As for the Hadamard-transformed DC coefficients ($HD_0 \ldots HD_{15}$) and the AC coefficients AC_coffs (including $AC_{k0}$ to $AC_{ke}$, k=0 ... 15) that are evaluated in parallel, the quantization of the Hadamard-transformed DC coefficients ($HD_0 \ldots HD_{15}$) may be performed in parallel to the quantization of the AC coefficients AC_coffs (including $AC_{k0}$ to $AC_{ke}$, k=0 ... 15), too. After quantization, the Hadamard-transformed DC coefficients ($HD'_0 \ldots HD'_{15}$) and the DCT AC coefficients $AC'_{k0}$ to $AC'_{ke}$ (k=0 ... 15) may be combined into transform and quantization coefficients C including matrixes $C_0$ to $C_{15}$ as below.

$$C_k = \begin{bmatrix} HD'_k & AC'_{k0} & AC'_{k1} & AC'_{k2} \\ AC'_{k3} & AC'_{k4} & AC'_{k5} & AC'_{k6} \\ AC'_{k7} & AC'_{k8} & AC'_{k9} & AC'_{ka} \\ AC'_{kb} & AC'_{kc} & AC'_{kd} & AC'_{ke} \end{bmatrix},$$

$$k = 0 \ldots 15$$

Especially, the DC coefficients ($DC_0 \ldots DC_{15}$) to be processed by Hadamard transform hardware 316 (in accordance with equation (2)) and the quantization hardware 318 for evaluation and quantization of the Hadamard-transformed DC coefficients ($HD_0 \ldots HD_{15}$) are evaluated by the DC coefficient evaluation hardware 312 based on equation (1) rather than being obtained from the 16 times of iterative calculations of equation (3). The computing speed of the video coding and decoding chip 100 is much faster in comparison with conventional techniques in which the DC and AC coefficients are not evaluated and processed separately and in parallel.

Figure 4:
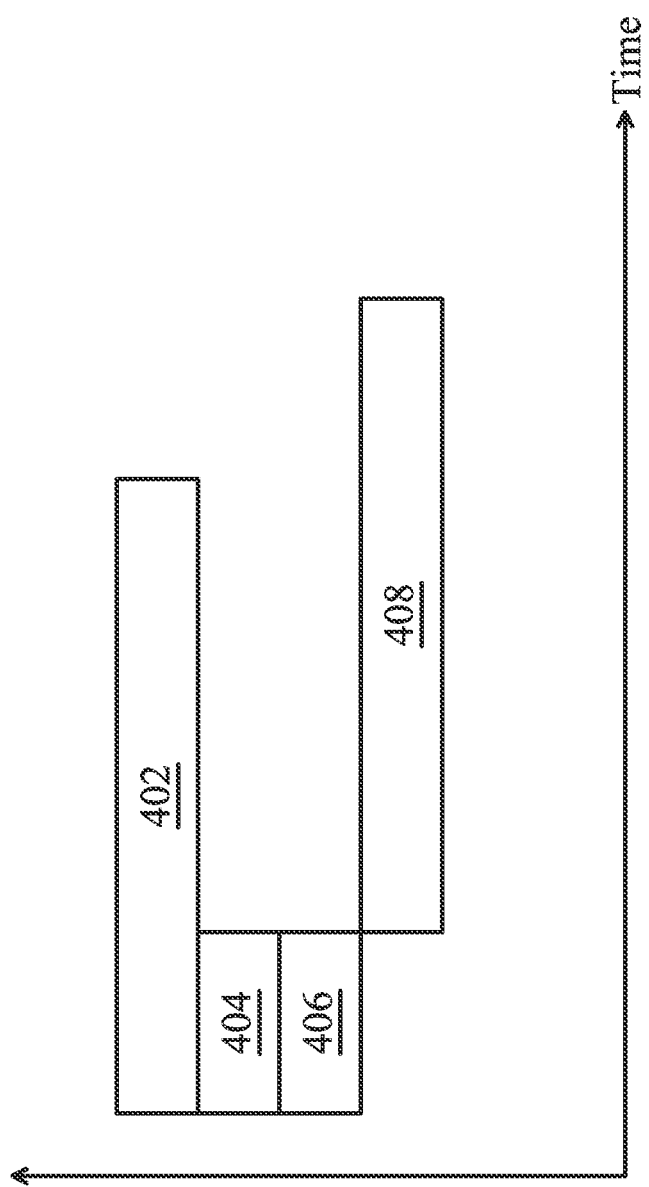
FIG. 4 is a hardware timing diagram of the data processing in the hardware 302 and 308 of FIG. 3.

FIG. 4 is a hardware timing diagram of the data processing in hardware 302 and 308 of FIG. 3. Bar 402 shows the timing of the AC coefficient evaluation (corresponding to equation (3)) and quantization. Bar 404 shows the timing of the DC coefficient evaluation (corresponding to equation (1)), the Hadamard transform (corresponding to equation (2)) and the corresponding quantization. Bar 406 shows the timing of the inverse quantization and inverse transform of the DC coefficients. Bar 408 shows the timing of the inverse quantization and inverse transform of the AC coefficients. As shown by bar 402 and bar 404, the evaluation of the DC coefficients is no longer constrained to the evaluation of the AC coefficients and is allowed to be performed in parallel to the evaluation of the AC coefficient evaluation. The computing speed of the video coding and decoding chip of the disclosure is much faster in comparison with conventional techniques in which the DC and AC coefficients are not separately evaluated and processed.

In this paragraph, the timing diagram shown in FIG. 4 is discussed further with respect to the block diagram shown in FIG. 3. The Hadamard transform hardware 316 starts the Hadamard transform on the DC coefficients ($DC_0 \ldots DC_{15}$) corresponding to the sixteen residual blocks $X_0 \ldots X_{15}$ (corresponding to 16 sub-blocks within one macroblock) before the AC coefficient evaluation hardware 314 completely evaluates the AC coefficients AC_coeffs (including $AC_{k0}$ to $AC_{ke}$, k=0 . . . 15) corresponding to the sixteen residual blocks $X_0 \ldots X_{15}$. In some exemplary embodiments, the Hadamard transform hardware 316 further finishes the Hadamard transform on the DC coefficients ($DC_0 \ldots DC_{15}$) corresponding to the sixteen residual blocks $X_0 \ldots X_{15}$ before the AC coefficient evaluation hardware 314 completely evaluates the AC factors AC_factors (including $AC_{k0}$ to $AC_{ke}$, k=0 . . . 15) corresponding to the sixteen residual blocks $X_0 \ldots X_{15}$. In some exemplary embodiments, the quantization hardware 318 starts quantization on the Hadamard-transformed DC coefficients ($HD_0 \ldots HD_{15}$) corresponding to the sixteen residual blocks $X_0 \ldots X_{15}$ before the AC coefficient evaluation hardware 314 completely evaluates the AC coefficients AC_coeffs (including $AC_{k0}$ to $AC_{ke}$, k=0 . . . 15) corresponding to the sixteen residual blocks $X_0 \ldots X_{15}$. In some exemplary embodiments, the quantization hardware 318 further finishes the quantization on the Hadamard-transformed DC coefficients ($HD_0 \ldots HD_{15}$) corresponding to the sixteen residual blocks $X_0 \ldots X_{15}$ before the AC coefficient evaluation hardware 314 completely evaluates the AC coefficients AC_coeffs (including $AC_{k0}$ to $AC_{ke}$, k=0 . . . 15) corresponding to the sixteen residual blocks $X_0 \ldots X_{15}$. In some exemplary embodiments, the inverse quantization and inverse DCT hardware 308 starts inverse quantization and inverse DCT on the transform coefficients C corresponding to the sixteen residual blocks $X_0 \ldots X_{15}$ before the AC coefficient evaluation hardware 314 completely evaluates the AC coefficients AC_coeffs (including $AC_{k0}$ to $AC_{ke}$, k=0 . . . 15) corresponding to the sixteen residual blocks $X_0 \ldots X_{15}$. By operating the hardware blocks in parallel, the computing speed of the advanced video coding and decoding techniques of the disclosure is much faster in comparison with the conventional coding techniques.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An advanced video coding and decoding chip, comprising:
    direct current coefficient evaluation hardware, evaluating direct current coefficients in discrete-cosine-transformed residual blocks corresponding to sixteen sub-blocks within a macroblock, each sub-block containing 4×4 pixels;
    Hadamard transform hardware, performing a Hadamard transform on the direct current coefficients corresponding to the sixteen sub-blocks to generate Hadamard-transformed direct current coefficients corresponding to the sixteen sub-blocks;
    alternating current coefficient evaluation hardware, evaluating alternating current coefficients in the discrete-cosine-transformed residual blocks corresponding to the sixteen sub-blocks; and
    quantization hardware, performing quantization on the Hadamard-transformed direct current coefficients corresponding to the sixteen sub-blocks and performing quantization on the alternating current coefficients corresponding to the sixteen sub-blocks to generate transform coefficients corresponding to the sixteen sub-blocks,
    wherein the direct current coefficient evaluation hardware performs a calculation, $DC_k = \Sigma_{i=0}^{3} \Sigma_{j=0}^{3} (X_k)_{ij}$, where k=0 . . . 15, $X_k$ is a residual block corresponding to one of the sixteen 4×4 sub-blocks and $DC_k$ is the corresponding direct current coefficient;
    wherein the alternating current coefficient evaluation hardware performs a calculation, $M_1 \cdot X_k \cdot M_2$ to get the alternating current coefficients, where $M_1$ and $M_2$ are a first 4×4 matrix and a second 4×4 matrix for a discrete-cosine-transform;
    wherein the Hadamard transform hardware starts the Hadamard transform on the direct current coefficients corresponding to the sixteen sub-blocks before the alternating current coefficient evaluation hardware completely evaluates the alternating current coefficients corresponding to the sixteen sub-blocks; and
    wherein the Hadamard transform hardware further finishes the Hadamard transform on the direct current coefficients corresponding to the sixteen sub-blocks before the alternating current coefficient evaluation hardware completely evaluates the alternating current coefficients corresponding to the sixteen sub-blocks.

2. The advanced video coding and decoding chip as claimed in claim 1, wherein:
    the quantization hardware starts the quantization on the Hadamard-transformed direct current coefficients corresponding to the sixteen sub-blocks before the alternating current coefficient evaluation hardware completely evaluates the alternating current coefficients corresponding to the sixteen sub-blocks.

3. The advanced video coding and decoding chip as claimed in claim 2, wherein:
    the quantization hardware finishes the quantization on the Hadamard-transformed direct current coefficients corresponding to the sixteen sub-blocks before the alternating current coefficient evaluation hardware completely evaluates the alternating current coefficients corresponding to the sixteen sub-blocks.

4. The advanced video coding and decoding chip as claimed in claim 3, further comprising:
    an inverse quantization and inverse discrete cosine transform hardware, starting inverse quantization and inverse discrete cosine transform on the transform coefficients corresponding to the sixteen sub-blocks before the alternating current coefficient evaluation hardware completely evaluates the alternating current coefficients corresponding to the sixteen sub-blocks.

5. A method for advanced video coding and decoding, comprising:
    using direct current coefficient evaluation hardware to evaluate direct current coefficients in discrete-cosine-transformed residual blocks corresponding to sixteen 4×4 sub-blocks within a macroblock;

using Hadamard transform hardware to perform a Hadamard transform on the direct current coefficients corresponding to the sixteen sub-blocks to generate Hadamard-transformed direct current coefficients corresponding to the sixteen sub-blocks;

using alternating current coefficient evaluation hardware to evaluate alternating current coefficients in the discrete-cosine-transformed residual blocks corresponding to the sixteen sub-blocks; and using quantization hardware to perform quantization on the Hadamard-transformed direct current coefficients corresponding to the sixteen sub-blocks and quantization on the alternating current coefficients corresponding to the sixteen sub-blocks to generate transform coefficients corresponding to the sixteen sub-blocks, wherein the direct current coefficient evaluation hardware is operated to perform a calculation, $DC_k=\Sigma_{i=0}^{3}\Sigma_{j=0}^{3}(X_k)_{ij}$, where $k=0 \ldots 15$, $X_k$ is a residual block corresponding to one of the sixteen 4×4 sub-blocks and $DC_k$ is the conesrrsponding direct current coefficient;

wherein the alternating current coefficient evaluation hardware is operated to perform a calculation, $M_1 \cdot X_k \cdot M_2$ to get the alternating current coefficients, where $M_1$ and $M_2$ are a first 4×4 matrix and a second 4×4 matrix for a discrete-cosine-transform;

wherein the Hadamard transform hardware starts the Hadamard transform on the direct current coefficients corresponding to the sixteen sub-blocks before the alternating current coefficient evaluation hardware completely evaluates the alternating current coefficients corresponding to the sixteen sub-blocks; and wherein the Hadamard transform hardware further finishes the Hadamard transform on the direct current coefficients corresponding to the sixteen sub-blocks before the alternating current coefficient evaluation hardware completely evaluates the alternating current coefficients corresponding to the sixteen sub-blocks.

6. The advanced video coding and decoding method as claimed in claim 5, wherein:

the quantization hardware starts the quantization on the Hadamard-transformed direct current coefficients corresponding to the sixteen sub-blocks before the alternating current coefficient evaluation hardware completely evaluates the alternating current coefficients corresponding to the sixteen sub-blocks.

7. The advanced video coding and decoding method as claimed in claim 6, wherein:

the quantization hardware finishes the quantization on the Hadamard-transformed direct current coefficients corresponding to the sixteen sub-blocks before the alternating current coefficient evaluation hardware completely evaluates the alternating current coefficients corresponding to the sixteen sub-blocks.

8. The advanced video coding and decoding method as claimed in claim 7, further comprising:

using an inverse quantization and inverse discrete cosine transform hardware to start inverse quantization and inverse discrete cosine transform on the transform coefficients corresponding to the sixteen sub-blocks before the alternating current coefficient evaluation hardware completely evaluates the alternating current coefficients corresponding to the sixteen sub-blocks.

* * * * *